(No Model.) 2 Sheets—Sheet 1.

A. GOLDSCHMID.
POCKET PHOTOGRAPHIC APPARATUS.

No. 441,064. Patented Nov. 18, 1890.

Witnesses,
Walter Scott

Inventor,
Albert Goldschmid
By Paine & Ladd,
attys.

THE NORRIS PETERS CO., PHOTO-LITHO., WASHINGTON, D. C.

(No Model.) 2 Sheets—Sheet 2.

A. GOLDSCHMID.
POCKET PHOTOGRAPHIC APPARATUS.

No. 441,064. Patented Nov. 18, 1890.

Witnesses,
Walter Scott
J. W. Totten

Inventor,
Albert Goldschmid
By Paine & Ladd,
attys.

THE NORRIS PETERS CO., PHOTO-LITHO., WASHINGTON, D. C.

UNITED STATES PATENT OFFICE.

ALBERT GOLDSCHMID, OF ZURICH, SWITZERLAND.

POCKET PHOTOGRAPHIC APPARATUS.

SPECIFICATION forming part of Letters Patent No. 441,064, dated November 18, 1890.

Application filed October 19, 1889. Serial No. 327,499. (No model.) Patented in Switzerland July 30, 1889, No. 1,241.

*To all whom it may concern:*

Be it known that I, ALBERT GOLDSCHMID, a citizen of Switzerland, residing at Zurich, in the Canton of Zurich, Switzerland, have invented certain new and useful Improvements in a Pocket Photographic Apparatus with double-camera simultaneously focusing and photographing objects, (for which I have obtained a patent in Switzerland, No. 1,241, dated July 30, 1889;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention pertains to a certain new and useful improvement in pocket photographic apparatus, by means of which an exact or perfect focus is readily secured on any object at any distance.

The invention comprises a photographic apparatus of opera or field glass form having an extensible ocular lens-tube, a removable frame for supporting the sensitive plate, and a slide having a collar or keeper for preventing the ingress of light, all substantially as hereinafter fully set forth, and particularly pointed out in the claims.

Figure 1:
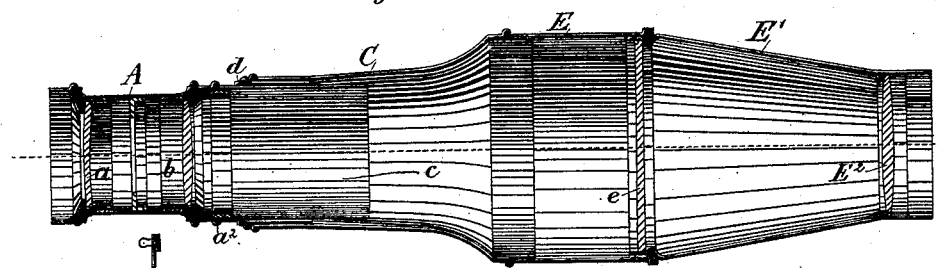
Figure 2:
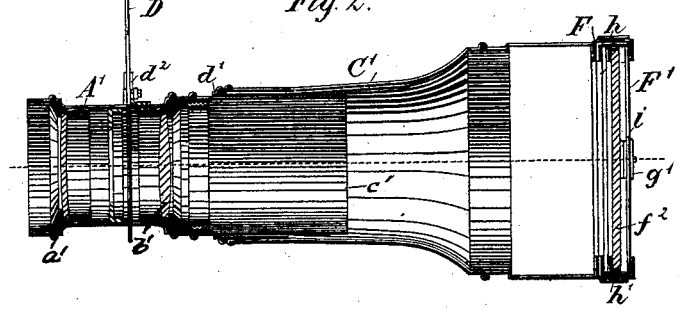
Figure 3:
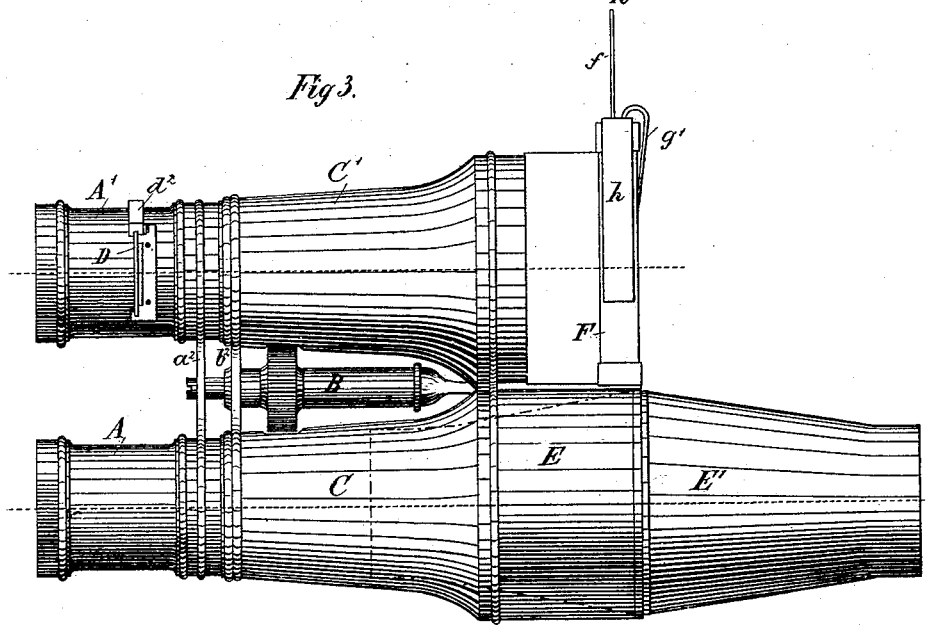
Figures 4, 5:
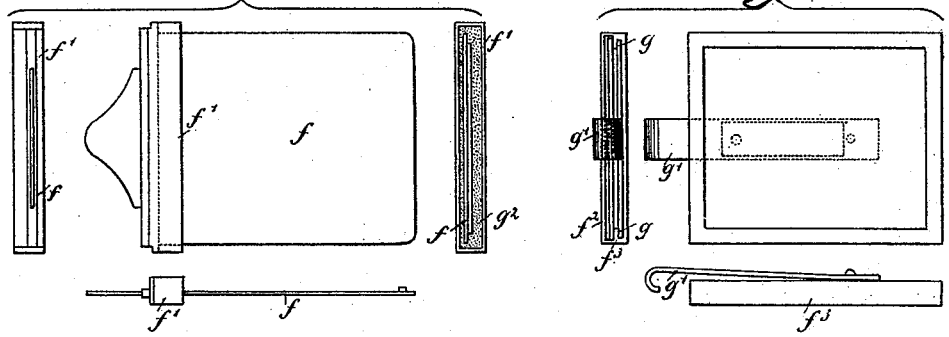
Figure 8:
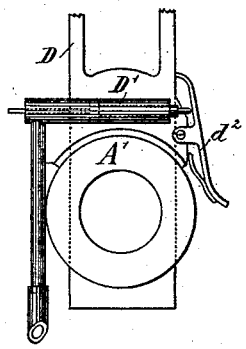

In the accompanying drawings, Figure 1 is a longitudinal sectional view taken through the focusing-camera. Fig. 2 is a similar view taken through the camera obscura. Fig. 3 is a plan view of my improved apparatus. Figs. 4 to 7 are views of the sensitive-plate frame and its adjuncts. Fig. 8 is a view showing means for operating the shutter.

Referring to the drawings, A designates the focusing-camera or one tube; A', the camera obscura or other tube; $a$ and $b$, the lenses of the former, and $a'$ and $b'$ the lenses of the latter. These parts are constructed after the usual form of an opera or field glass camera. The tubes are connected by a yoke $a^2$, and are moved forward or backward simultaneously by the grooved pulley B and screw-bolt $b^2$. The cylindrical ends $c\ c'$ of tubes A A' are telescoped and guided by cones C C', the collared ends $d\ d'$ of which bear on said cylinders.

The tube or camera obscura A' has secured thereto the instantaneous shutter D, which may be operated by a lever $d^2$, engaging therewith and moved by hand, and by a pneumatic attachment, as shown in Fig. 8, in which the air pressed out of a hand-bulb (not shown) operates upon a piston in the cylinder D', effecting the releasing and lowering of the shutter.

E' is a conical tube carrying an ocular lens $E^2$, and the same is removably secured to the cylindrical end E of the apparatus, and it is through this means that the rays reach the eye of the operator. In this tube is a disk $e$ of ground glass, whereon the reversed picture of the object is visible. When not in use, this tube E' may be reversed and secured in the position shown by dotted lines in Fig. 3.

Figure 6:
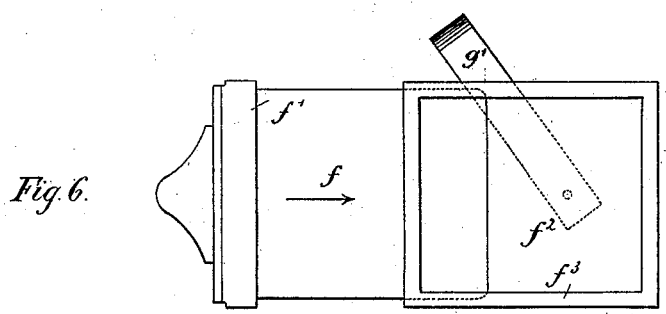
Figure 7:
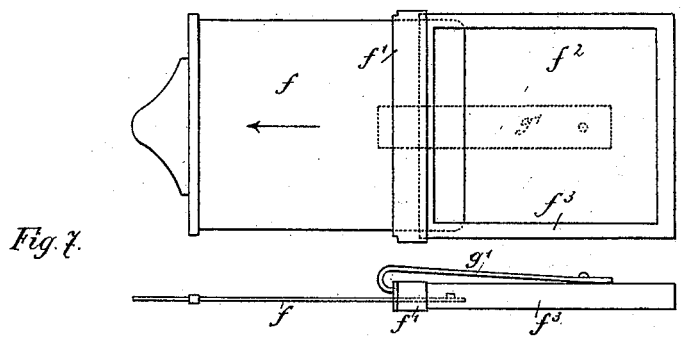

The camera obscura or tube A' is provided at its rear end with a frame F for reception of a casing F'. This casing consists of a slide $f$, a keeper or collar $f'$ secured thereon, a sensitive plate $f^2$, and a square frame $f^3$, in a guide $g$ of which moves said slide $f$. In Fig. 6 the sensitive plate is shown placed in frame $f^3$, and after slide $f$ is moved in the direction of the arrow the spring $g'$ is pressed down and caused to engage and hold the keeper or collar $f'$, after which, when the casing F' is placed in frame F, the slide can be moved in the direction of the arrow, Fig. 7. The keeper or collar is provided with a layer or covering of caoutchouc, in order to secure perfect darkness and prevent the ingress of light. The flat springs $h$ and $h'$, Figs. 2 and 3, serve to hold frame $f^3$ in frame F, the sensitive plate being held by flat spring $i$. If the focus of the lenses $a\ a'$ and $b\ b'$ is the same, it is necessary that the ground-glass disk $e$ and the sensitive-plate $f^2$ have an accordant position. In every other case where the mode of operation of the two-lens system above referred to is different the position of the plates $e$ and $f^2$ must be made to agree therewith.

I claim as my invention—

1. A photographic apparatus comprising a focusing-camera, a camera obscura secured thereto and having conjoint movement therewith, and an ocular tube securing to said focusing-camera and having a lens and a ground-glass disk, and capable of being reversed and placed in said latter camera, substantially as set forth.

2. A photographic apparatus comprising a focusing-camera provided with an ocular lens and a ground-glass disk, a camera obscura secured thereto and having conjoint movement therewith, the shutter in the forward end of said camera obscura, and a slide and sensitive plate in the rear end thereof, substantially as set forth.

3. In a photographic camera, the frame having the sensitive plate, the slide provided with a keeper or collar loosely secured in one end thereof, and a spring for holding said keeper or collar when said slide is withdrawn, substantially as set forth.

4. In a photographic camera having the frame F at its rear end, the frame having the sensitive plate, and the springs $h$, $h'$, and $i$, substantially as set forth.

In testimony whereof I affix my signature in presence of two witnesses.

ALBERT GOLDSCHMID. [L. S.]

Witnesses:
H. LEABHART,
A. C. CLAMANN.